United States Patent
Jiang et al.

(10) Patent No.: US 11,073,831 B2
(45) Date of Patent: Jul. 27, 2021

(54) AUTONOMOUS DRIVING USING A STANDARD NAVIGATION MAP AND LANE CONFIGURATION DETERMINED BASED ON PRIOR TRAJECTORIES OF VEHICLES

(71) Applicant: Baidu USA LLC, Sunnyvale, CA (US)

(72) Inventors: Yifei Jiang, Sunnyvale, CA (US); Liangliang Zhang, Sunnyvale, CA (US); Dong Li, Sunnyvale, CA (US); Jiaming Tao, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 67 days.

(21) Appl. No.: 16/163,500

(22) Filed: Oct. 17, 2018

(65) Prior Publication Data
US 2020/0125102 A1    Apr. 23, 2020

(51) Int. Cl.
*G05D 1/02* (2020.01)
*G05D 1/00* (2006.01)
*H04W 4/40* (2018.01)

(52) U.S. Cl.
CPC .......... *G05D 1/021* (2013.01); *G05D 1/0088* (2013.01); *G05D 1/0044* (2013.01); *G05D 2201/0213* (2013.01); *H04W 4/40* (2018.02)

(58) Field of Classification Search
CPC ......... G01C 21/32; G06F 16/29; G06F 16/58; G06K 9/00825
See application file for complete search history.

(56) References Cited

U.S. PATENT DOCUMENTS

2018/0203453 A1*  7/2018  Hardy .............. G08G 1/096725

FOREIGN PATENT DOCUMENTS

| JP | 2006236247 A | 9/2006 |
|---|---|---|
| JP | 2018055222 A | 4/2018 |

OTHER PUBLICATIONS

Tang et al. Lane-Level Road Information Mining, ISPRS Int. J. Geo-Inf, 2015(4):2660-2680 (Year: 2015).*

(Continued)

*Primary Examiner* — Yuen Wong
(74) *Attorney, Agent, or Firm* — Womble Bond Dickinson (US) LLP

(57) ABSTRACT

In one embodiment, perception data is received from a number of autonomous driving vehicles (ADVs) over a network. The perception data includes information describing a set of trajectories that a number of vehicles having driven through a road segment of a road and perceived by one or more ADVs using their respective sensors driving on the same road segment. In response to the perception data, an analysis is performed on the perception data, i.e., the trajectories, to determine one or more lanes within the road segment. For each of the lanes, a lane reference line associated with the lane is calculated based on the trajectories within the corresponding lane. The lane metadata describing the lane reference lines for the one or more lanes are stored in a lane configuration data structure such as a database. The lane configuration database can then be utilized for autonomous driving at real-time subsequently without having to use a high definition map.

18 Claims, 14 Drawing Sheets

(56) References Cited

OTHER PUBLICATIONS

Chen et al., DeepDriving: Learning Affordance for Direct Perception in Autonomous Driving, Proceedings of 15th IEEE International Conference on Computer Vision (ICCV2015), Sep. 26, 2015, https://deepdriving.cs.princeton.edu/paper.pdf (Year: 2015).*

* cited by examiner

| Lane Configure DB 313 | | | | |
|---|---|---|---|---|
| Lane Reference Line(s) | ... | ... | ... | ... |
| Road Reference Line | Road Ref. Line 1 | Road Ref. Line 2 | ... | Road Ref. Line N |

FIG. 4

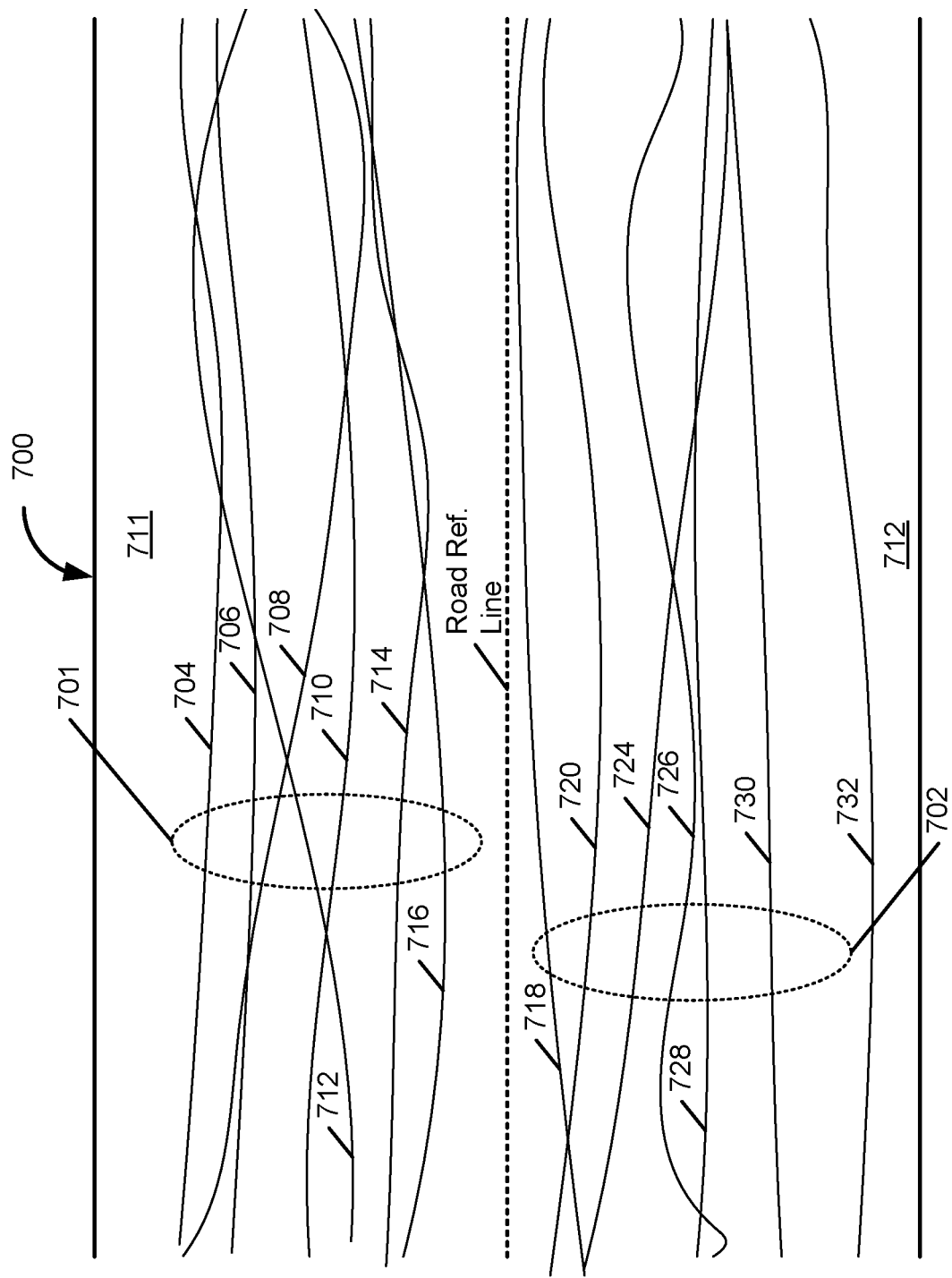

AUTONOMOUS DRIVING USING A STANDARD NAVIGATION MAP AND LANE CONFIGURATION DETERMINED BASED ON PRIOR TRAJECTORIES OF VEHICLES

TECHNICAL FIELD

Embodiments of the present disclosure relate generally to operating autonomous vehicles. More particularly, embodiments of the disclosure relate to autonomous driving using a standard navigation map and lane configuration that is determined based on prior trajectories of vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Typically, planning of autonomous driving relies heavily on the map information to guide an autonomous vehicle (ADV) without user intervention. A typical map such as a Google or Baidu map refers to as a navigation map that can be utilized to navigate from road to road. However, such a navigation map does not have more details such as lane configuration information. Thus, a navigation map is not sufficient enough for autonomous driving. In order to autonomously drive an ADV, a high-definition (HD) map is required, which includes lane configuration with roads. However, such an HD map may not be available at some time and it is generally expensive to generate and maintain an HD map.

BRIEF DESCRIPTION OF THE DRAWINGS

Embodiments of the disclosure are illustrated by way of example and not limitation in the figures of the accompanying drawings in which like references indicate similar elements.

FIG. 4 shows a lane configuration data structure according to one embodiment.

FIGS. 7A-7C are diagrams illustrating a process of generating lane configuration of a road segment according to one embodiment.

DETAILED DESCRIPTION

Figure 1:
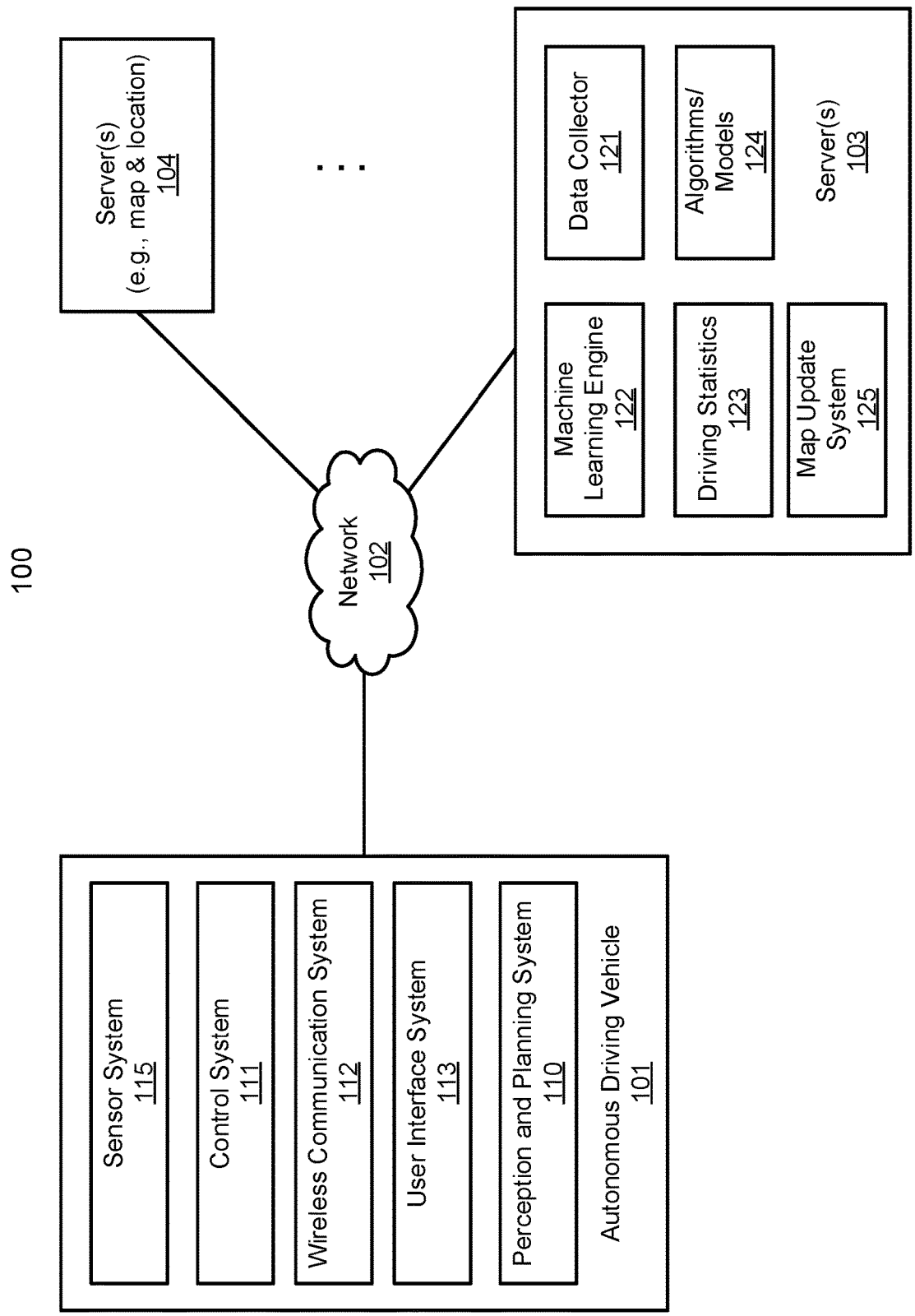
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one aspect of the invention, perception data is received from a cloud sourcing data provider such as a number of autonomous driving vehicles (ADVs) over a network (e.g., a cloud network). The perception data includes information describing a set of trajectories that a number of vehicles having driven through a road segment of a road and perceived by one or more ADVs using their respective sensors (e.g., cameras) driving on the same road segment. In response to the perception data, an analysis is performed on the perception data, i.e., the trajectories, to determine one or more lanes within the road segment. For each of the lanes, a lane reference line associated with the lane is calculated based on the trajectories within the corresponding lane. The lane metadata describing the lane reference lines for the one or more lanes are stored in a lane configuration data structure such as a database. The lane configuration database can then be utilized for autonomous driving at real-time subsequently without having to use a high definition (HD) map.

In one embodiment, the trajectories of the vehicles were observed by one or more sensors of one or more ADVs when those vehicles were also driving within the same road. The ADVs are equipped with one or more cameras that can observe how other vehicles were driving (e.g., paths, speeds, heading directions) at different points in time within the road. The lane configuration data structure stores a number of lane reference lines of a number of road segment of a variety of roads. Each of the reference lines is generated based on the prior trajectories of vehicles navigating through a corresponding road segment without using an HD map.

In one embodiment, in calculating a lane reference line associated with a lane, any trajectories that significantly deviate from the trajectories of the remaining trajectories are removed from consideration. A smoothing operation is performed on the remaining trajectories. An averaged trajectory is then calculated from the remaining trajectories to represent the target lane reference line of the corresponding road segment. In addition, a lane width of the lane is calculated based on the trajectories within the lane. For example, the lane width may be determined based on the lateral distance between two most outward trajectories plus a predetermined buffer distance or margin.

Subsequently, according to one embodiment, a request is received from an ADV requesting for lane configuration of a particular road segment or road. In response to the request, a query is performed in the lane configuration database based on a road segment identifier or road identifier to determine or retrieve one or more lane reference lines associated with one or more lanes within the road segment or road. The reference lines with optional lane width of the lanes are then returned to the ADV to enable the ADV to plan and control the ADV without having to use an HD map. The request may include a starting point and an ending point of a road reference line obtained from a standard navigation map at the ADV. Based on the starting point and the end point, as well as the road identifier, the corresponding lane reference lines can be ascertained.

According to another aspect, a request is received to drive an ADV from a starting location to a destination location. The request may be received from a passenger via a user interface within the ADV. In response to the request, one or more roads connecting the starting location and the destination location are determined based on a standard navigation map. For each of the roads from the starting location and the destination location, a road reference line is obtained from the navigation map. Based on the road reference line, a query is performed at a lane configuration data structure to obtain one or more lane reference lines associated with one or more lanes within the road, without having to use an HD map. Based on the lane reference lines, a route is planned to autonomously drive the ADV from the starting location to the destination location.

In one embodiment, in querying the lane configuration data structure, the query is transmitted to a remote server over a network, where the remote server maintains the lane configuration database. In response to the query, the remote server accesses the lane configuration database based on the road reference line to identify and retrieve lane reference lines, without having to use an HD map. The remote server then transmits the lane reference lines back to the ADV to be utilized by the ADV for autonomous driving.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
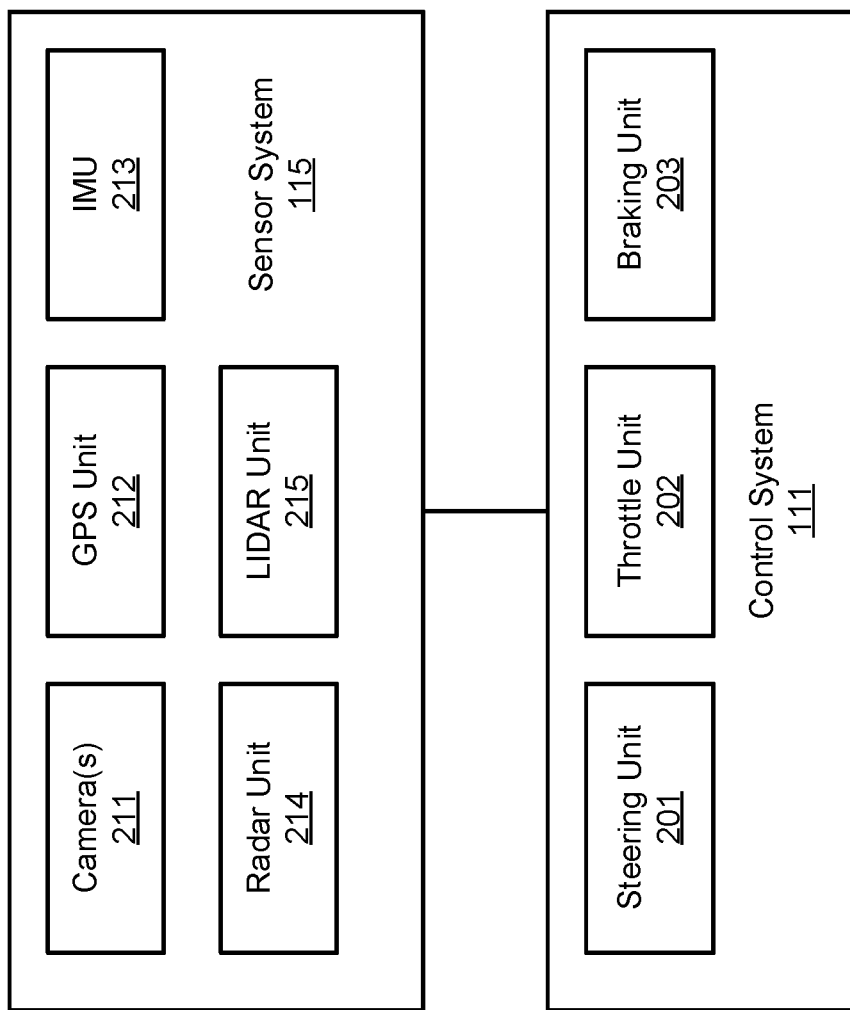
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle.

Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

In addition, data collector 121 may further collect trajectories driven by a number of vehicles on a variety of roads, which may be perceived from a number of autonomous driving vehicles using their respective sensors. The trajectory information concerning the trajectories may be received from the autonomous driving vehicles over a network as a part of cloud sourcing data collection mechanism.

Based on driving statistics 123, machine learning engine 122 generates or trains a set of rules, algorithms, and/or predictive models 124 for a variety of purposes. In one embodiment, algorithms 124 may include the algorithms or models to detect or determine the driving behaviors of the vehicles and to derive the lane configuration based on the trajectories driven by the vehicles in the past. Algorithms 124 can then be utilized by map update module 125 to determine lane configuration of roads, such as lane reference lines, based on the analysis of the trajectory information sufficient for autonomous driving. The lane reference lines may be utilized by the ADVs in conjunction with the standard navigation map to form a higher definition map for autonomous driving. The higher definition map includes lane configuration information such as lane reference lines of one or more lanes within a road, where a navigation map normal lacks such lane configuration information. In addition, a lane configuration database may be created to store the correspondences between the road reference lines obtained from a navigation map and the lane reference lines determined based on the trajectories. The lane configuration database may be maintained by server 103 and accessible in real-time over a network. Alternatively, the lane configuration database may be uploaded onto the autonomous driving vehicles for autonomous driving subsequently.

Figure 3A:
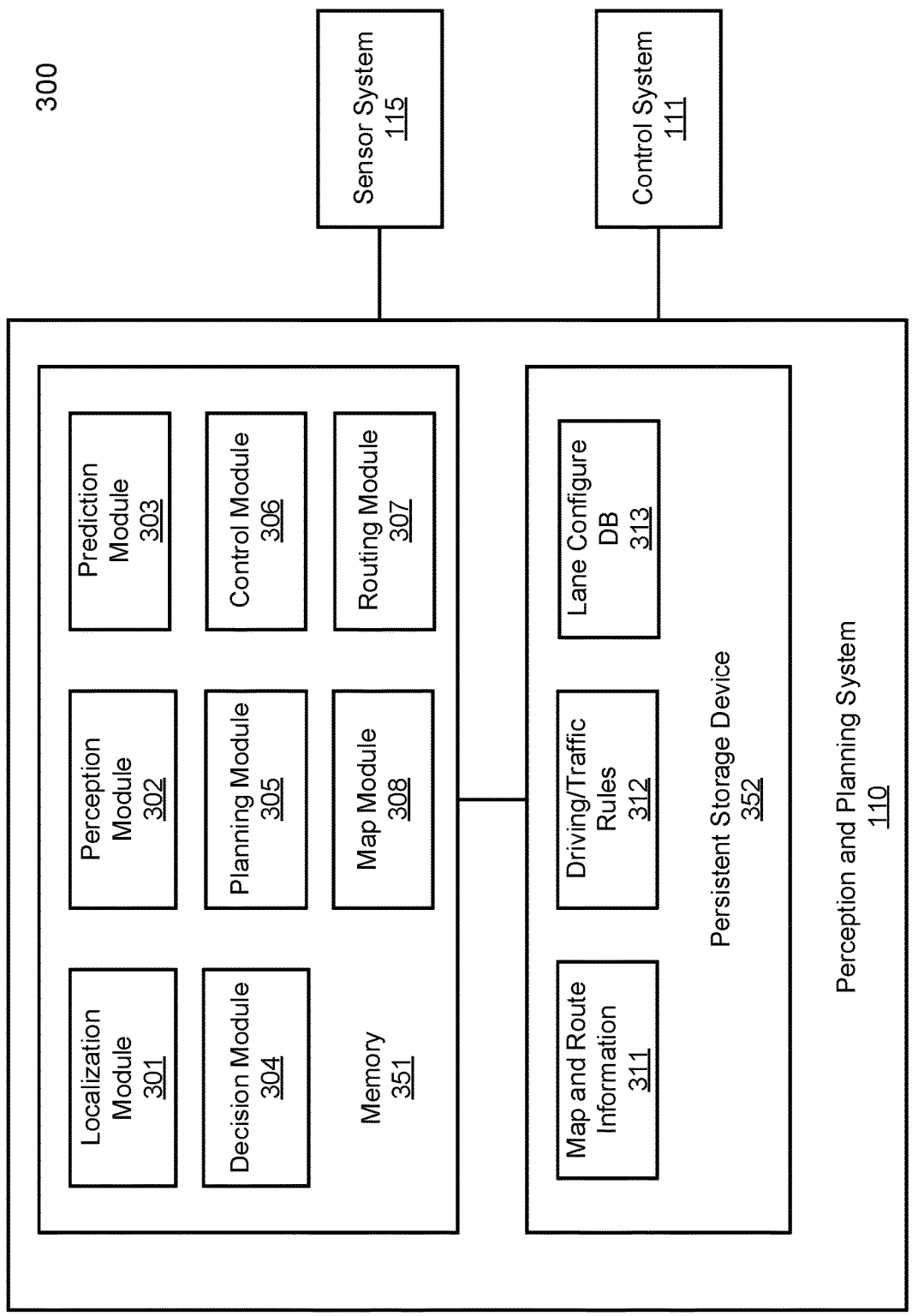
FIGS. 3A-3B are block diagrams illustrating an example of a perception and planning system used with an autonomous vehicle according to one embodiment.
Figure 3B:
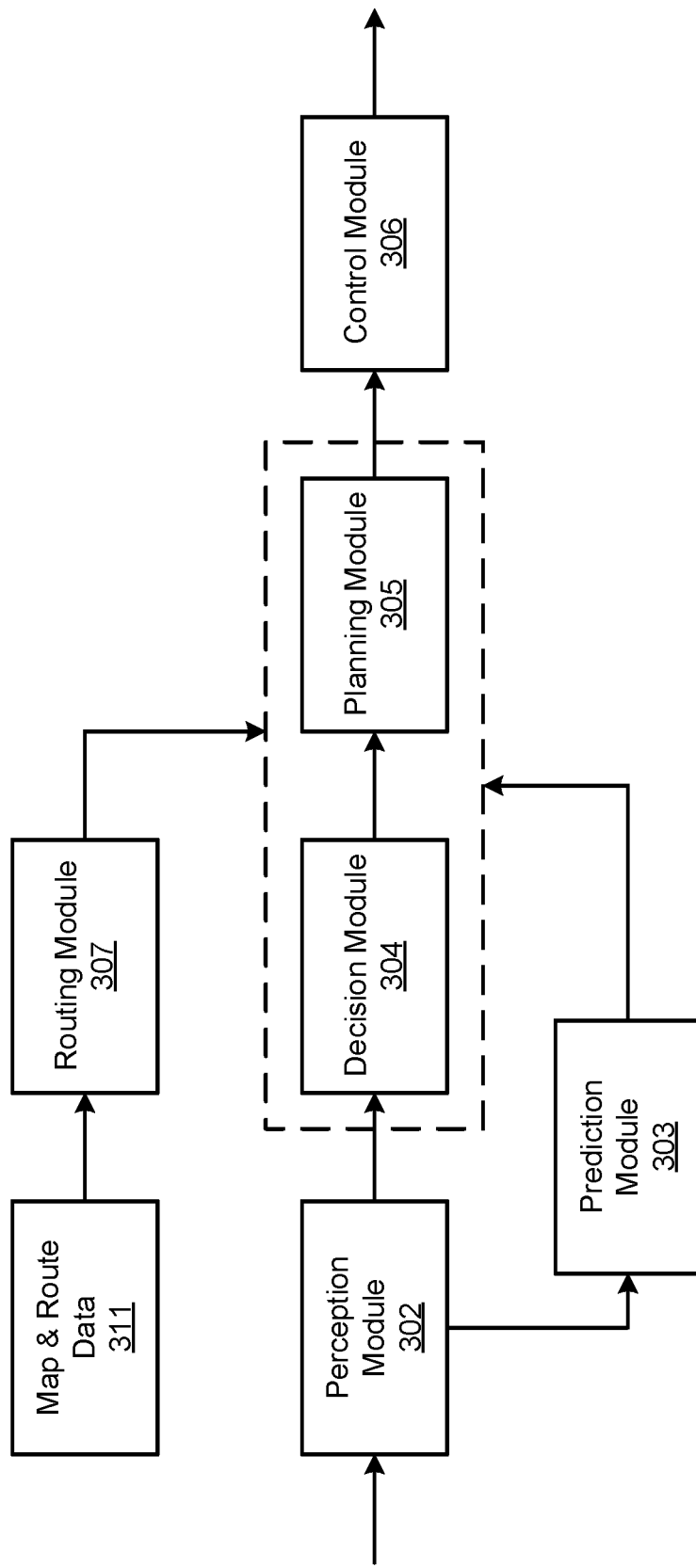

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and map module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, map module 308 is configured to provide map services to other modules such as modules 301-307. In response to a request to create a route from a starting location to a destination, map module 308 is configured to identify and determine a map segment of a navigation map, which may be stored as a part of map and route information 311. From the navigation map, map module 308 can obtain a road reference line of a road between the starting location and the destination location. Based on the road reference line, map module 308 perform a search in lane configuration database 313 to obtain one or more lane reference lines associated with one or more lanes within the road. The lane reference lines can be utilized by modules 301-307 to plan a path and autonomously drive the vehicle according to the path.

Figure 5:
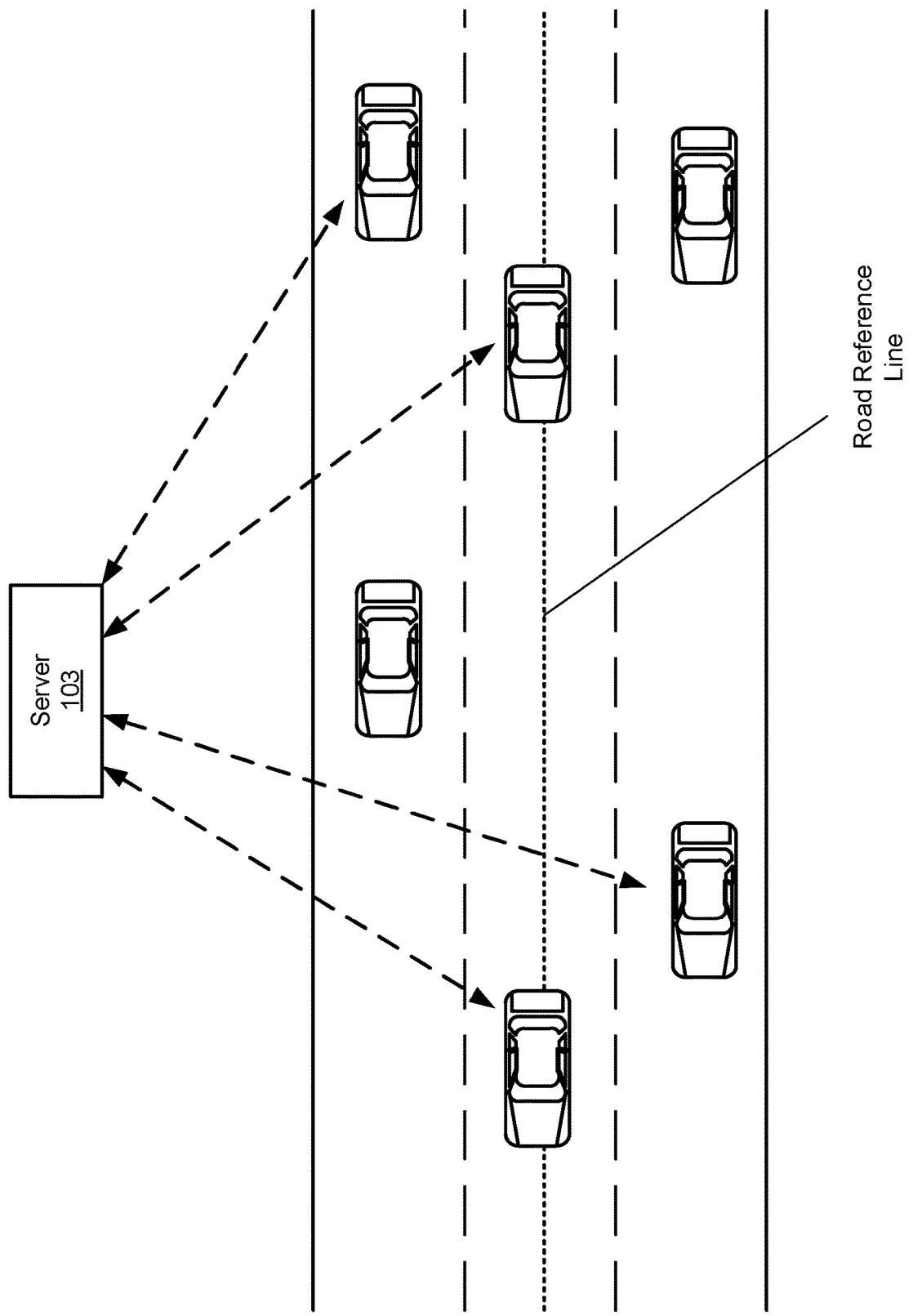
FIG. 5 shows a cloud sourcing autonomous driving data collection system according to one embodiment.

In one embodiment, as shown in FIG. 4 as an example, lane configuration database 313 includes a number of entries. Each entry maps a particular road reference line or road ID 401 of a road to one or more lane reference lines 402 associated with one or more lanes within the road. Lane configuration database 313 may be generated by a data analytics server such as server 103 based on prior perception data such as prior trajectories driven by a number of vehicles through certain roads. The perception data or the trajectories may be captured by other vehicles such as ADVs driving on the same roads. Each of the vehicles that capture the perception data is configured to transmit the perception data to a centralized server 103 over a network in a cloud sourcing manner, as shown in FIG. 5.

The centralized server 103 performs an analysis on the perception to determine the lane configuration of the roads, including generating lane reference lines associated with the lanes within the roads. Based on the analysis, lane configuration database 313 is created and the lane configuration database 313 is then uploaded onto the ADVs for autonomous driving at real-time. Note that lane configuration database 313 may be periodically updated or synchronized from the server, and cached within the vehicle. Alternatively, map module 308 is configured dynamically contact the remote server over the network to obtain one or more lane reference lines, in response to a particular road reference line.

Figure 6:
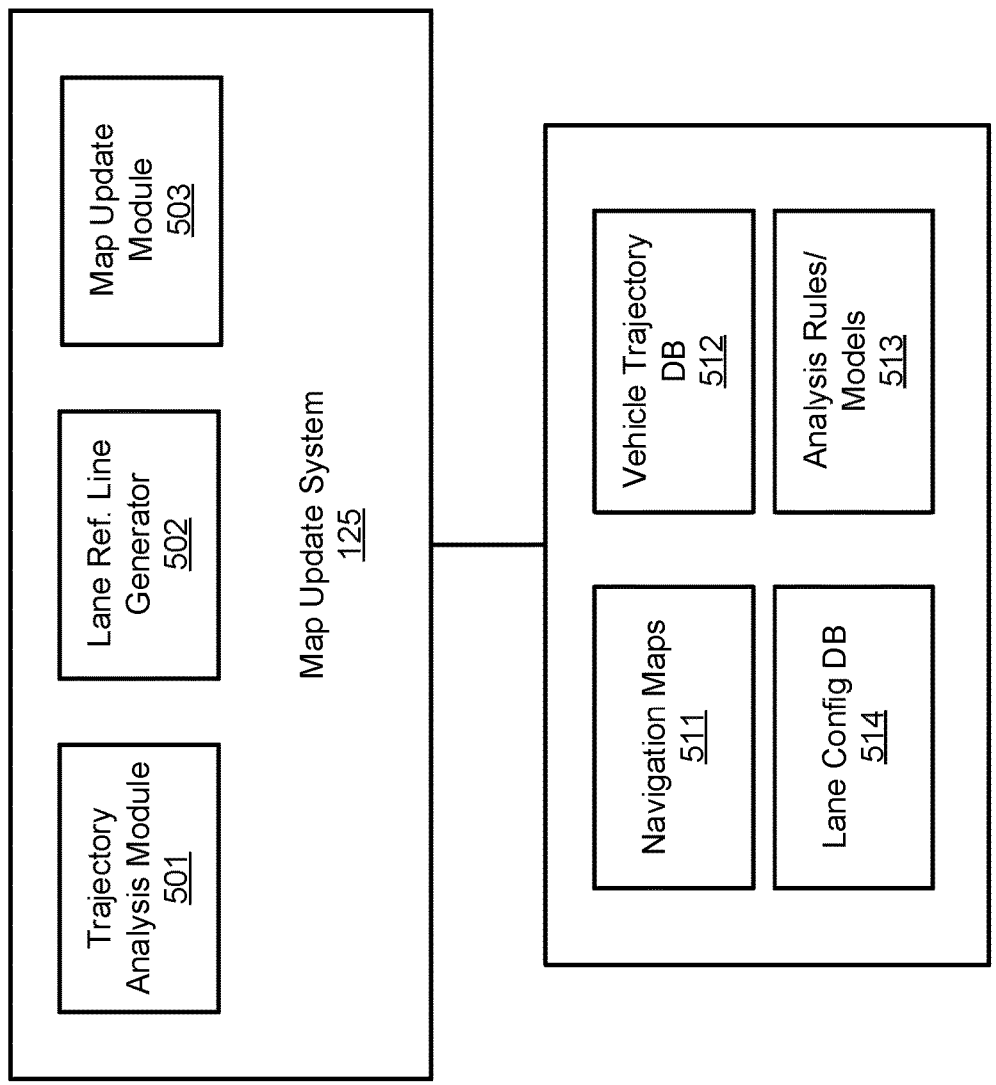
FIG. 6 is a block diagram illustrating an example of a map update system according to one embodiment.

FIG. 6 is a block diagram illustrating an example of a map update system according to one embodiment. Referring to FIG. 6, map update system 125 includes, but is not limited to, trajectory analysis module 501, lane reference line generator 502, and optional map update module 503. According to one embodiment, trajectory analysis module 501 is configured to perform an analysis on trajectory data stored in trajectory database 512. The trajectory data stored in trajectory database 512 may be collected from a large number of vehicles (e.g., ADVs) that perceived how other vehicles driving through a variety of road segments of a variety of roads, for example, in a distributed or cloud sourcing manner.

In one embodiment, for a given road segment of a road that is identified from an ordinary navigation map 511, analysis module 501 determines a set of trajectories from trajectory database 512 representing the driving patterns of a number of vehicles driving through the same road segment. Analysis module 501 then performs an analysis on the trajectories associated with the road segment using a set of analytics rules (or algorithms or predictive models) 513 to determine the driving behaviors or patterns of the vehicles. Rules 513 may be trained and generated by a machine learning engine (e.g., machine learning engine 122), for example, as a part of rules and/or algorithms 124, based on a large amount of driving statistics 123 collected in the past by data collector 121.

Based on the driving behaviors of the vehicles, lane reference line generator 502 (also referred to as a lane configuration determination module) is configured to determine a number of lanes with the road segment. For each lane, lane reference line generator 502 calculates a reference line based on the trajectories corresponding to the lane. For example, lane reference line generator 502 may calculate an average trajectory from all of the trajectories within the same lane to represent the lane reference line. In one embodiment, prior to calculating a lane reference line, some of the outlier trajectories may be removed from consideration. In addition, a smoothing operation such as polynomial fitting may be performed to smooth the trajectories prior to calculating the lane reference line.

The determined reference lines are then stored in lane configuration database 514. In one embodiment, lane configuration database 514 includes a number of entries. Each entry maps a particular road reference line (or road reference line ID identifying a particular road reference line) to one or more lane reference lines (or lane reference line IDs identifying lane reference lines). The lane configuration database 514 may be uploaded onto the ADVs to be utilized for autonomous driving without having to use an HD map. Alternatively, an API may be maintained to allow any of ADVs to access lane configuration database 514 during the autonomous driving at real-time. Optionally, map update module 503 can update a standard navigation map based on the lane configuration to generate a higher definition map, which is sufficient for autonomous driving.

Figure 7A:
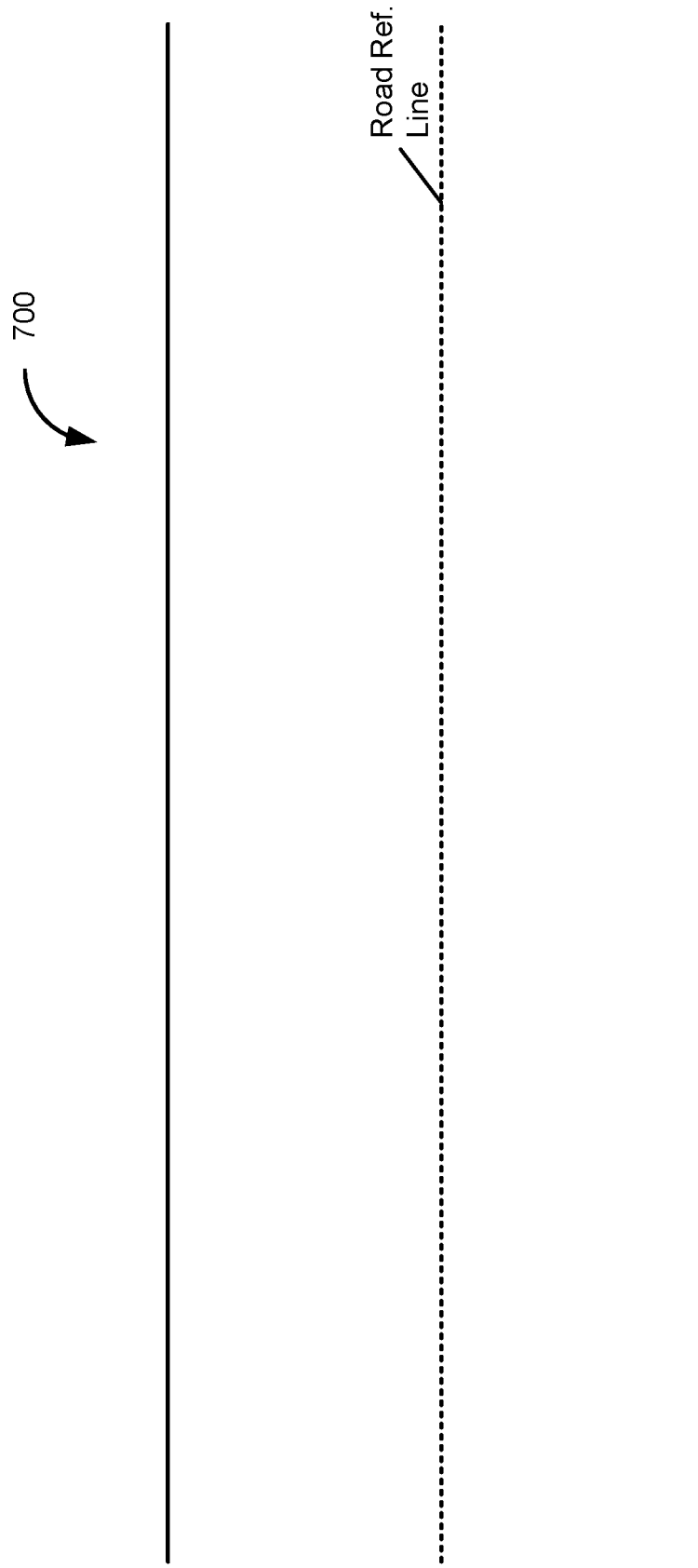

Referring now to FIG. 7A, FIG. 7A shows a road segment that is typically provided by a standard navigation map. The navigation map normally can only provide road level information about the road segment, such as, for example, a road reference line, road width, whether the road is a highway or a local road, etc. There is no lane configuration provided by the navigation map such as a number of lanes and the lane width of the lanes, etc.

FIG. 7B shows the trajectories that have been projected onto the road segment of the navigation map, where the trajectories represent the paths a number of vehicles have driven through the same road segment for a period of time. The trajectories may be received at a centralized server from a number of vehicles such as autonomous driving vehicles, where those vehicles perceive using their sensors (e.g., cameras) mounted on the vehicles how other vehicles traveled through the same road segment. They also captured using their sensors the trajectories of other vehicles driving through the road segment. The captured trajectories are transmitted to the centralized server in a form of trajectory metadata describing the trajectories after certain processing, for example, as a part of trajectory data stored at the server. Alternatively, the processing of trajectories may be performed at the centralizer server, in which the vehicles may simply transmit the images of the perceived environment to the server. But such a configuration may require a higher network bandwidth and larger storage space.

Figure 7C:
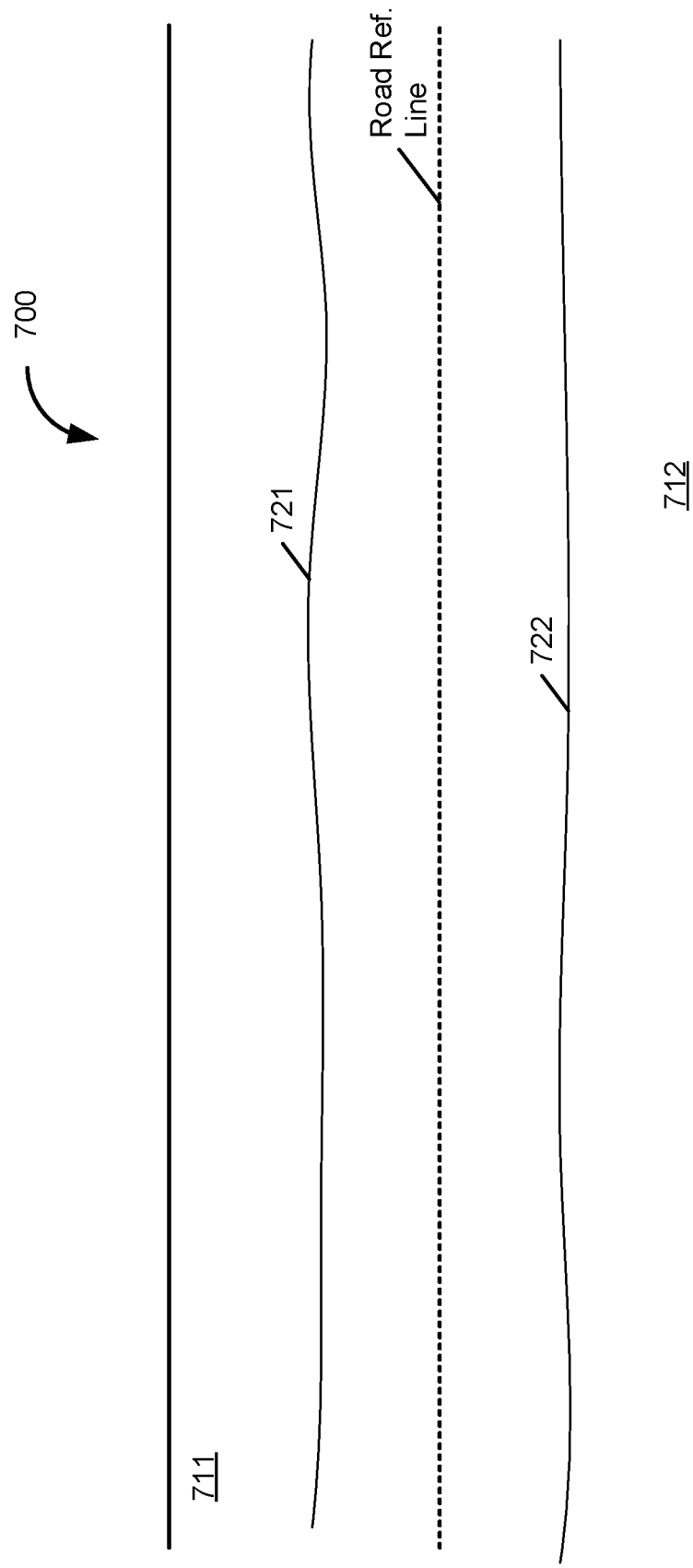

According to one embodiment, analysis module 501 can detect in this example a first set of trajectories 701(701A-701G) and a second set of trajectories 702 (702A-702G) within road segment 700. Based on the majority of the trajectories in two sets are split into two main streams, it can be inferred using the set of analysis rules that there may be two lanes within road 700, i.e., lanes 711-712. For each set of the trajectory sets 701-702, a lane reference line is calculated, for example, by calculating an averaged trajectory amongst all of the trajectories, such as, for example, lane reference lines 721-722 as shown in FIG. 7C.

In addition, according to one embodiment, the lane width of each lane may also be determined, for example by evenly dividing the detected lanes. Furthermore, a lane boundary of a most left or most right lane can be determined, for example, by measuring the trajectories. For example, by measuring the locations of the most left and most right points of the trajectories, the lane boundary can be derived by adding a buffer or margin on the top. Further, based on the driving behaviors, the system may detect that there is no lane changing around a particular area. That is, no vehicle has changed lanes around the area. Thus, there must be a static object such as a lane divider that may have prevented any vehicle from crossing over. Such an area can be indicated that no lane changing is allowed on the map. On the other hand, the lane changeable area can also be labeled around the non-changeable area based on the trajectories by adding sufficient buffer areas surrounding.

Similarly, an intersection of the road segment can also be detected based on the trajectories. For example, if there are some trajectories turning left or right at a particular location of the road, while some other trajectories go straight, it can be reasonably assumed that there may be an intersection there. In another example, if an image captured by a camera shows a pedestrian while the trajectories show that most or all of the vehicles stop at that location, it can reasonably assumed there may be a pedestrian crosswalk there. In further example, if the system detects that most or all of the vehicles stop at a particular location for several seconds and then restart to move, it can be reasonably assumed that there may be a stop line or stop sign at the location. Such findings can be recorded as a part of lane configuration information 601.

Note that trajectories are utilized as an example of perception data. The techniques described through this application can also be utilized for updating a low-definition map to become a higher definition map that is sufficient for autonomous driving based on a variety of prior driving behaviors and statistics of a variety of vehicles.

Figure 8:
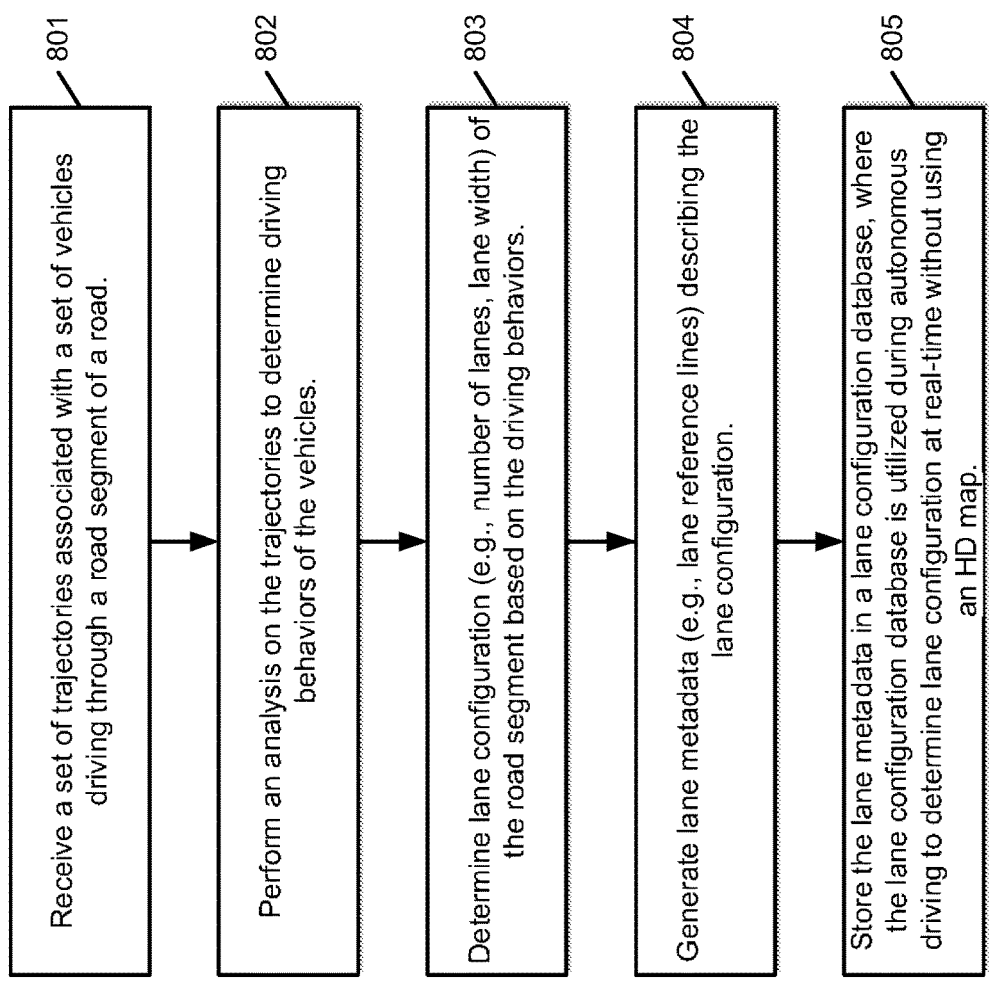
FIG. 8 is a flow diagram illustrating a process of generating lane configuration based on prior trajectories according to one embodiment.

FIG. 8 is a flow diagram illustrating an example of a process of generating lane configuration of roads according to one embodiment. Process 800 may be performed by processing logic which may include software, hardware, or a combination thereof. For example, process 800 may be performed by map update system 125. Referring to FIG. 8, in operation 801, processing logic receives a set of trajectories associated with a set of vehicles driving through a road segment. The trajectories may be collected from a variety of vehicles observing other vehicles driving through the same road segment in a cloud sourcing manner. In operation 802, processing logic performs a trajectory analysis on the trajectories to determine driving behaviors of the vehicles. In operation 803, processing logic determines lane configuration of the road segment based on the driving behaviors, such as, a number of lanes within the road segment, lane width, and lane reference line, etc. of each lane. In operation 804, lane metadata or configuration information describing the lane configuration is generated. In operation 805, the lane configuration information is stored in a lane configuration database, where the lane configuration database can be utilized subsequently for autonomous driving in real-time.

Figure 9:
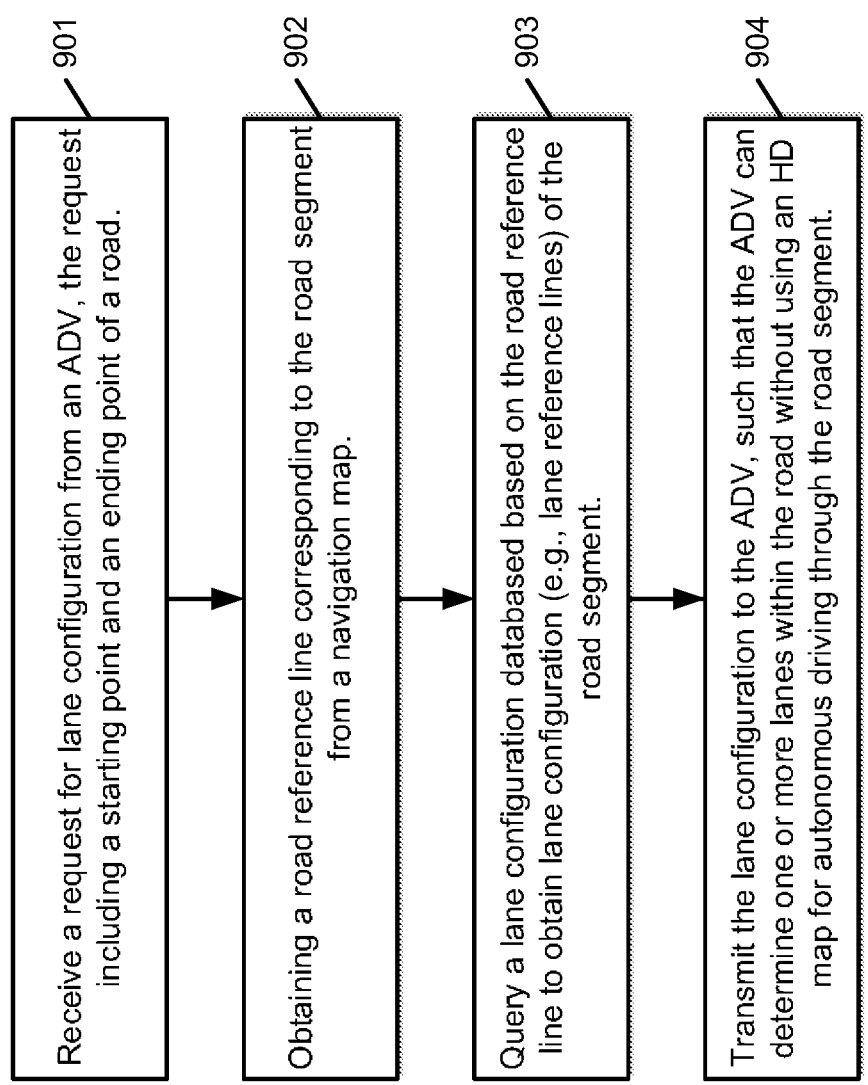
FIG. 9 is a flow diagram illustrating a process of providing map services according to one embodiment.

FIG. 9 is a flow diagram illustrating a process of providing lane configuration as a part of map services according to one embodiment. Process 900 may be performed by processing logic which may include software, hardware, or a combination thereof. For example, process 900 may be performed by a service platform using a lane configuration database that was created based on prior trajectories without using a high definition map. Referring to FIG. 9, in operation 901, processing logic receives a request for lane configuration from an ADV, where the request includes a starting point and an ending point of a road of a route. In operation 902, processing logic optionally determines a road reference line based on the starting point and the end point in view of a navigation map, for example, by projecting the starting point and the ending point onto a corresponding map segment of the navigation map. In operation 903, based on the starting point and the ending point of the road or the road reference line, processing logic queries a lane configuration database to identify and retrieve the corresponding one or more lane reference lines. In operation 904, processing logic transmitting lane metadata describing the lane reference lines to the ADV to allow the ADV to perform autonomous driving using the lane reference lines.

Figure 10:
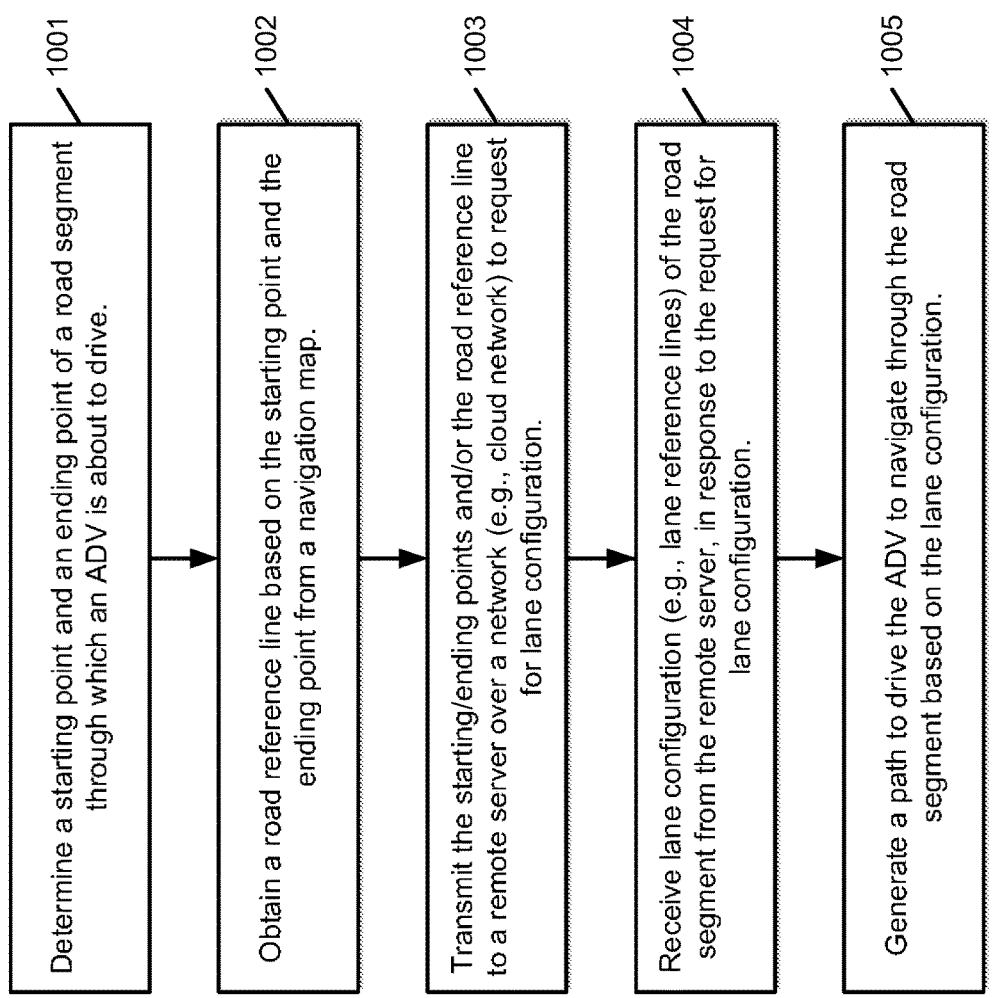
FIG. 10 is a flow diagram illustrating a process of operating an autonomous driving vehicle according to one embodiment.

FIG. 10 is a flow diagram illustrating an example of a process of generating lane configuration of roads according to one embodiment. Process 1000 may be performed by processing logic which may include software, hardware, or a combination thereof. For example, process 1000 may be performed by planning and control system 110 of an ADV. Referring to FIG. 10, in operation 1001, processing logic determines a starting point and an ending point of a road segment as a part of a route of an ADV. In operation 1002, processing logic optionally determines a road reference line or road configuration of the road segment based on the starting point and the end point in view of a map segment of a navigation map corresponding to the road segment. In operation 1003, processing logic transmits the starting and ending points (or the road reference line or road configuration) to a remote server over a network to retrieve lane configuration of the road segment. In operation 1004, processing logic receives the lane configuration from the remote server. The lane configuration includes one or more lane reference lines associated with one or more lanes within the road segment. In operation 1005, processing logic plans a path based on the lane configuration to navigate from the starting point and ending point to drive the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
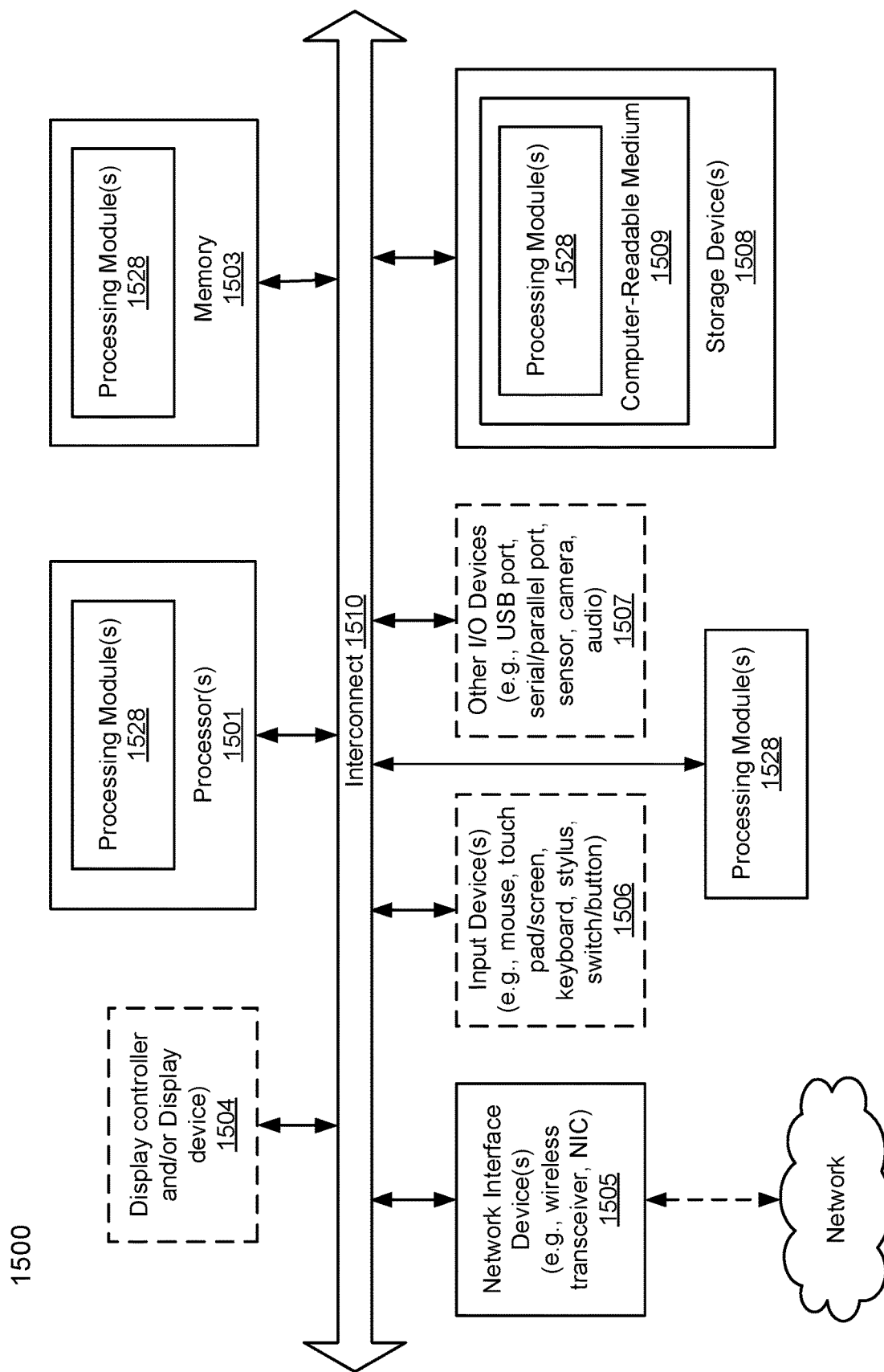
FIG. 11 is a block diagram illustrating a data processing system according to one embodiment.

FIG. 11 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, or map update system 125. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for generating a high-definition (HD) lane configuration of lanes for autonomous driving, the method comprising:
   receiving perception data describing a set of trajectories driven by a plurality of autonomous driving vehicles (ADVs) navigating through a road segment of a road over a period of time;
   performing an analysis using a set of rules on the set of trajectories to determine one or more lanes within the road segment;
   for each of the one or more lanes, calculating a lane reference line associated with the lane based on the trajectories within the lane;
   storing the lane reference lines of the one or more lanes corresponding to the road segment in a lane configuration database; and
   determining a lane width for each of the lanes within the road segment based on a lateral distance between two most outward trajectories of the ADVs plus a predetermined buffer distance, wherein the lane width is stored in the lane configuration database,
   wherein the lane configuration database storing the lane reference lines and lane widths of the lanes within the road segment is utilized by a vehicle control system and a perception and planning system of an ADV,
   wherein the perception and planning system perceives a driving environment of the road segment, and plans a trajectory, and the vehicle control system controls at least an engine and a steering wheel of the ADV that drives on the road segment using driving commands to guide the ADV according to the trajectory, without having to use an HD map provided by a map provider.

2. The computer-implemented method of claim 1, wherein the trajectories were observed by one or more sensors of the plurality of ADVs when the ADVs were driving through the road segment.

3. The computer-implemented method of claim 1, wherein the lane configuration database stores a plurality of lane reference lines of a plurality of road segments of a plurality of roads, and wherein each of the reference lines is generated based on prior trajectories of ADVs navigating through a corresponding road segment without using the HD map.

4. The computer-implemented method of claim 1, wherein the calculating the lane reference line associated with the lane based on the trajectories within the lane comprises:
   removing any trajectory that deviates from remaining ones of the trajectory;
   performing a smoothing operation to smooth the remaining trajectories; and
   calculating an averaged trajectory amongst the smoothed trajectories to represent the lane reference line.

5. The computer-implemented method of claim 1, further comprising:
   receiving a request for a lane reference line of a second road segment from an ADV over a network;
   querying the lane configuration database based on the second road segment to retrieve one or more lane reference lines associated with the second road segment; and
   transmitting the retrieved lane reference lines to the ADV.

6. The computer-implemented method of claim 5, wherein the request includes a starting point and an ending point of a road reference line associated with the second road segment, wherein the road reference line is utilized to query the lane configuration database to retrieve the lane reference lines.

7. The computer-implemented method of claim 5, wherein the lane configuration database comprises a plurality of mapping entries, wherein each mapping entry maps a particular road reference line to one or more lane reference lines.

8. A non-transitory machine-readable medium having instructions stored therein, which when executed by a processor, cause the processor to perform operations, the operations comprising:
   receiving perception data describing a set of trajectories driven by a plurality of autonomous driving vehicles (ADVs) navigating through a road segment of a road over a period of time;
   performing an analysis using a set of rules on the set of trajectories to determine one or more lanes within the road segment;
   for each of the one or more lanes, calculating a lane reference line associated with the lane based on the trajectories within the lane;
   storing the lane reference lines of the one or more lanes corresponding to the road segment in a lane configuration database; and
   determining a lane width for each of the lanes within the road segment based on a lateral distance between two most outward trajectories of the ADVs plus a predetermined buffer distance, wherein the lane width is stored in the lane configuration database,
   wherein the lane configuration database storing the lane reference lines and lane widths of the lanes within the road segment is utilized by a vehicle control system and a perception and planning system of an ADV,
   wherein the perception and planning system perceives a driving environment of the road segment, and plans a trajectory, and the vehicle control system controls at least an engine and a steering wheel of the ADV that drives on the road segment using driving commands to guide the ADV according to the trajectory, without having to use an HD map provided by a map provider.

9. The non-transitory machine-readable medium of claim 8, wherein the trajectories were observed by one or more sensors of the plurality of ADVs when the vehicles were driving through the road segment.

10. The non-transitory machine-readable medium of claim 8, wherein the lane configuration database stores a plurality of lane reference lines of a plurality of road segments of a plurality of roads, and wherein each of the reference lines is generated based on prior trajectories of ADVs navigating through a corresponding road segment without using the HD map.

11. The non-transitory machine-readable medium of claim 8, wherein the calculating the lane reference line associated with the lane based on the trajectories within the lane comprises:
   removing any trajectory that deviates from remaining ones of the trajectory;
   performing a smoothing operation to smooth the remaining trajectories; and
   calculating an averaged trajectory amongst the smoothed trajectories to represent the lane reference line.

12. The non-transitory machine-readable medium of claim 8, wherein the operations further comprise:
   receiving a request for a lane reference line of a second road segment from an ADV over a network;

querying the lane configuration database based on the second road segment to retrieve one or more lane reference lines associated with the second road segment; and transmitting the retrieved lane reference lines to the ADV.

13. The non-transitory machine-readable medium of claim 12, wherein the request includes a starting point and an ending point of a road reference line associated with the second road segment, wherein the road reference line is utilized to query the lane configuration database to retrieve the lane reference lines.

14. The non-transitory machine-readable medium of claim 12, wherein the lane configuration database comprises a plurality of mapping entries, wherein each mapping entry maps a particular road reference line to one or more lane reference lines.

15. A data processing system, comprising:
a processor; and
a memory coupled to the processor to store instructions, which when executed by the processor, cause the processor to perform operations, the operations including:
receiving perception data describing a set of trajectories driven by a plurality of autonomous driving vehicles (ADVs) navigating through a road segment of a road over a period of time;
performing an analysis using a set of rules on the set of trajectories to determine one or more lanes within the road segment;
for each of the one or more lanes, calculating a lane reference line associated with the lane based on the trajectories within the lane;
storing the lane reference lines of the one or more lanes corresponding to the road segment in a lane configuration database; and
determining a lane width for each of the lanes within the road segment based on a lateral distance between two most outward trajectories of the ADVs plus a predetermined buffer distance, wherein the lane width is stored in the lane configuration database,
wherein the lane configuration database storing the lane reference lines and lane widths of the lanes within the road segment is utilized by a vehicle control system and a perception and planning system of an ADV,
wherein the perception and planning system perceives a driving environment of the road segment, and plans a trajectory, and the vehicle control system controls at least an engine and a steering wheel of the ADV that drives on the road segment using driving commands to guide the ADV according to the trajectory, without having to use an HD map provided by a map provider.

16. The data processing system of claim 15, wherein the trajectories were observed by one or more sensors of the plurality of ADVs when the vehicles were driving through the road segment.

17. The data processing system of claim 15, wherein the lane configuration database stores a plurality of lane reference lines of a plurality of road segments of a plurality of roads, and wherein each of the reference lines is generated based on prior trajectories of ADVs navigating through a corresponding road segment without using the HD map.

18. The data processing system of claim 15, wherein the calculating the lane reference line associated with the lane based on the trajectories within the lane comprises:
removing any trajectory that deviates from remaining ones of the trajectory;
performing a smoothing operation to smooth the remaining trajectories; and
calculating an averaged trajectory amongst the smoothed trajectories to represent the lane reference line.

* * * * *